US 11,616,558 B2

(12) United States Patent
Josan et al.

(10) Patent No.: US 11,616,558 B2
(45) Date of Patent: Mar. 28, 2023

(54) PROCEDURAL DELAYS AND SCHEDULING RESTRICTION BASED ON COMPONENT CARRIER GROUPS

(71) Applicant: QUALCOMM Incorporated, San Diego, CA (US)

(72) Inventors: Awlok Singh Josan, San Francisco, CA (US); Valentin Alexandru Gheorghiu, Tokyo (JP); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/092,085

(22) Filed: Nov. 6, 2020

(65) Prior Publication Data
US 2021/0152230 A1 May 20, 2021

Related U.S. Application Data

(60) Provisional application No. 62/938,263, filed on Nov. 20, 2019.

(51) Int. Cl.
H04B 7/06 (2006.01)
H04L 5/00 (2006.01)
(52) U.S. Cl.
CPC ......... *H04B 7/0695* (2013.01); *H04L 5/0023* (2013.01); *H04L 5/0048* (2013.01)
(58) Field of Classification Search
None
See application file for complete search history.

(56) References Cited

U.S. PATENT DOCUMENTS

2011/0249665 A1* 10/2011 Seyama ............... H04L 27/2646
370/350
2012/0087257 A1* 4/2012 Larsson ............ H04W 36/0072
370/252
2013/0279356 A1* 10/2013 Park ..................... H04B 7/0695
370/252
2016/0255671 A1* 9/2016 Rahman ................ H04W 24/08
370/329
2016/0262180 A1* 9/2016 Rahman .................... H04L 5/22
2016/0270139 A1* 9/2016 Rahman ................. H04L 5/001
2016/0295583 A1* 10/2016 Kazmi ................. H04W 76/15
2016/0323834 A1* 11/2016 Rahman ............... H04W 52/34
2016/0345316 A1* 11/2016 Kazmi ............. H04W 72/0446
2017/0366313 A1* 12/2017 Rahman ................ H04W 56/00
(Continued)

OTHER PUBLICATIONS

Apple Inc, "Remaining Issues on Multi-beam operation", 3GPP TSG RAN WG1 #99, Reno, USA, Nov. 18-22, 2019 (Year: 2019).*
(Continued)

Primary Examiner — Andrew C Oh
(74) Attorney, Agent, or Firm — Procopio, Cory, Hargreaves & Savitch LLP

(57) ABSTRACT

A configuration to enable a UE to switch beams of respective CCs based on certain factors (e.g., RTD or TCI states), and not switch the beams simultaneously. The apparatus receives, from a base station, a transmission including an indication to change at least one of a TCI state for multiple CCs, a spatial relation for the multiple CCs, or a PL RS for the multiple CCs. The apparatus switches beams in response to the transmission, where timing of the switching is based on a grouping of the multiple CCs.

29 Claims, 9 Drawing Sheets

(56) References Cited

U.S. PATENT DOCUMENTS

| | | | | |
|---|---|---|---|---|
| 2017/0367045 | A1* | 12/2017 | Rahman | H04W 76/15 |
| 2019/0082436 | A1* | 3/2019 | Huang | H04W 16/14 |
| 2019/0239093 | A1* | 8/2019 | Zhang | H04W 72/046 |
| 2019/0364520 | A1* | 11/2019 | Kazmi | H04W 56/00 |
| 2020/0107308 | A1* | 4/2020 | Liao | H04L 5/0042 |
| 2020/0145947 | A1* | 5/2020 | Gheorghiu | H04W 76/15 |
| 2020/0288479 | A1* | 9/2020 | Xi | H04W 72/042 |
| 2020/0403761 | A1* | 12/2020 | Nguyen | H04W 72/0453 |
| 2021/0314888 | A1* | 10/2021 | Rahman | H04W 56/004 |
| 2022/0078603 | A1* | 3/2022 | Takada | H04W 56/004 |

OTHER PUBLICATIONS

Huawei, "Discussion on MRTD requirements for NR intra-band non-contiguous CA", 3GPP TSG-RAN WG4 Meeting #91, May 13-17, 2019 (Year: 2019).*

MediaTek, "Discussion on remaining issues on TCI switching", 3GPP TSG-RAN WG4 Meeting #92, Ljubljana, SI, Aug. 26-30, 2019 (Year: 2019).*

Intel, "Discussion on multi-beam enhancements", 3GPP TSG RAN WG1 #98, Prague, CZ, Aug. 26-30, 2019 (Year: 2019).*

Apple Inc: "Remaining Issues on Multi-Beam Operation", 3GPP Draft, R1-1912824, 3GPP TSG-RAN WG1 #99, 3rd Generation Partnership Project (3GPP), vol. RAN WG1, No. Reno, USA, Nov. 18, 2019-Nov. 22, 2019, Nov. 9, 2019 (Nov. 9, 2019), XP051823624, 14 Pages, Retrieved from the Internet: URL:https://ftp.3gpp.org/tsg_ran/WG1_RL1/TSGR1_99/Docs/R1-1912824.zip, [retrieved on Nov. 9, 2019] Section 1 Section 3, pp. 1-6, 1 Introduction pp. 6-10, 2 Overhead and Latency Reduction p. 13, 4.3 Clarification of Measurement Restriction.

Huawei, et al., "Discussion on MRTD Requirements for NR Intra-Band Non contiguous CA", 3GPP Draft, R4-1906507, 3GPP TSG-RAN WG4 Meeting #91, 3rd Generation Partnership Project (3GPP), Mobile Competence Centre, 650, Route Des Lucioles, F-06921 Sophia-Antipolis Cedex, France, vol. RAN WG4, No. Reno, USA, May 13, 2019-May 17, 2019, May 13, 2019 (May 13, 2019), XP051733418, 2 Pages, Retrieved from the Internet: URL: http://www.3gpp.org/ftp/Meetings_3GPP_SYNC/RAN4/Docs/R4-1906507.zip [retrieved on May 13, 2019] the Whole Document.

Intel Corporation: "Discussion on Multi-Beam Enhancements," 3GPP Draft, 3GPP TSG RAN WG1 #98, R1-1908654, Discussion On Multi-Beam Enhancements, 3rd Generation Partnership Project (3GPP), vol. RAN WG1, No. Prague, CZ, Aug. 26, 2019-Aug. 30, 2019, Aug. 17, 2019 (Aug. 17, 2019), XP051765262, 16 pages, Retrieved from the Internet: URL: http://www.3gpp.org/ftp/tsg_ran/WG1_RL1/TSGR1_98/Docs/R1-1908654.zip [retrieved on Aug. 17, 2019] paragraph [0004], figure 7, the Whole Document.

International Search Report and Written Opinion—PCT/US2020/059741—ISA/EPO—dated Feb. 12, 2021.

Mediatek Inc: "Discussion on Remaining Issues on TCI Switching", 3GPP Draft, R4-1908701, 3GPP TSG-RAN WG4 Meeting #92, Discussion On Remaining Issues in TCI Switching, 3rd Generation Partnership Project (3GPP), vol. RAN WG4, No. Ljubljana, SI, Aug. 26, 2019-Aug. 30, 2019,Aug. 16, 2019 (Aug. 16, 2019), XP051771648, 3 Pages, Retrieved from the Internet: URL: http://www.3gpp.org/ftp/tsg_ran/WG4_Radio/TSGR4_92/Docs/R4-1908701.zip [retrieved on Aug. 16, 2019] the Whole Document.

Qualcomm Incorporated: "Remaining Issues on Cross-Carrier Scheduling with Different Numerologies", 3GPP Draft, 3GPP TSG-RAN WG1 #98bis, R1-1911142, 3rd Generation Partnership Project, vol. RAN WG1, No. Chongqing, CN, Oct. 14, 2019-Oct. 20, 2019, Oct. 5, 2019, XP051808865,9 pages, Retrieved from Internet: URL: https://ftp.3gpp.org/tsg_ran/WG1_RL1/TSGR1_98b/Docs/R1-1911142.zip. [retrieved Oct. 5, 2019] pp. 1-3, 2.1 POSCH Beam Switch Latency in Cross-Carrier Scheduling pp. 3-5, 2.2 PDCCH-to-PDSCH Delay for Cross-Carrier Scheduling, Whole Document.

* cited by examiner

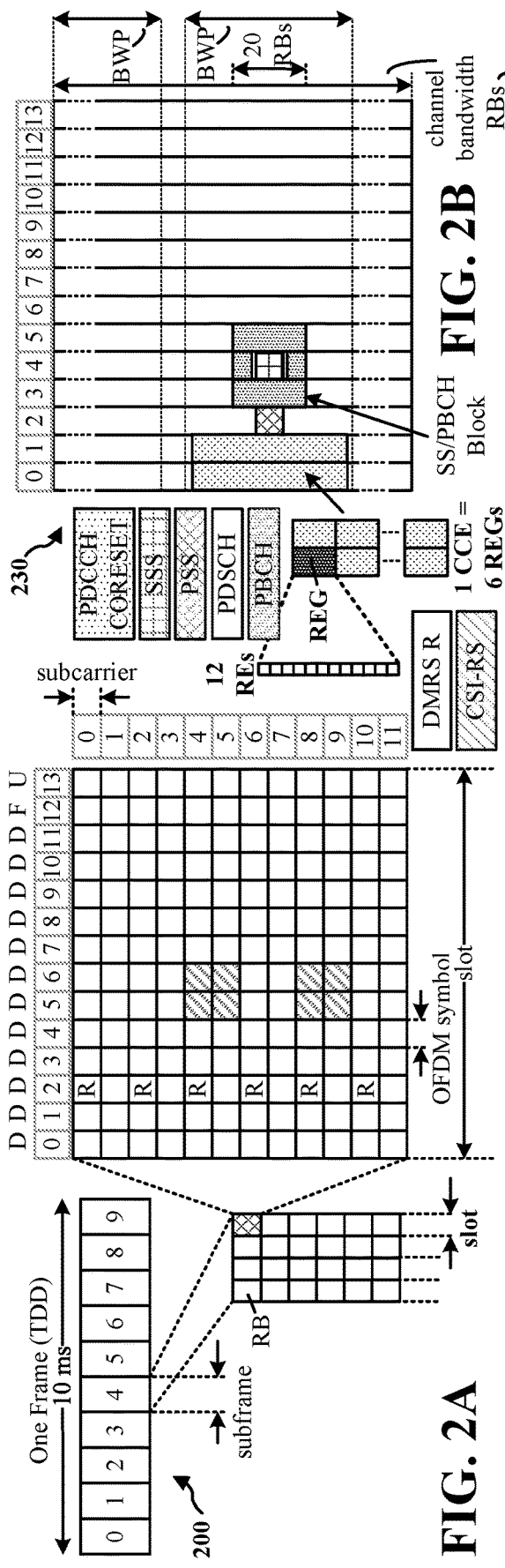
FIG. 2A
FIG. 2B
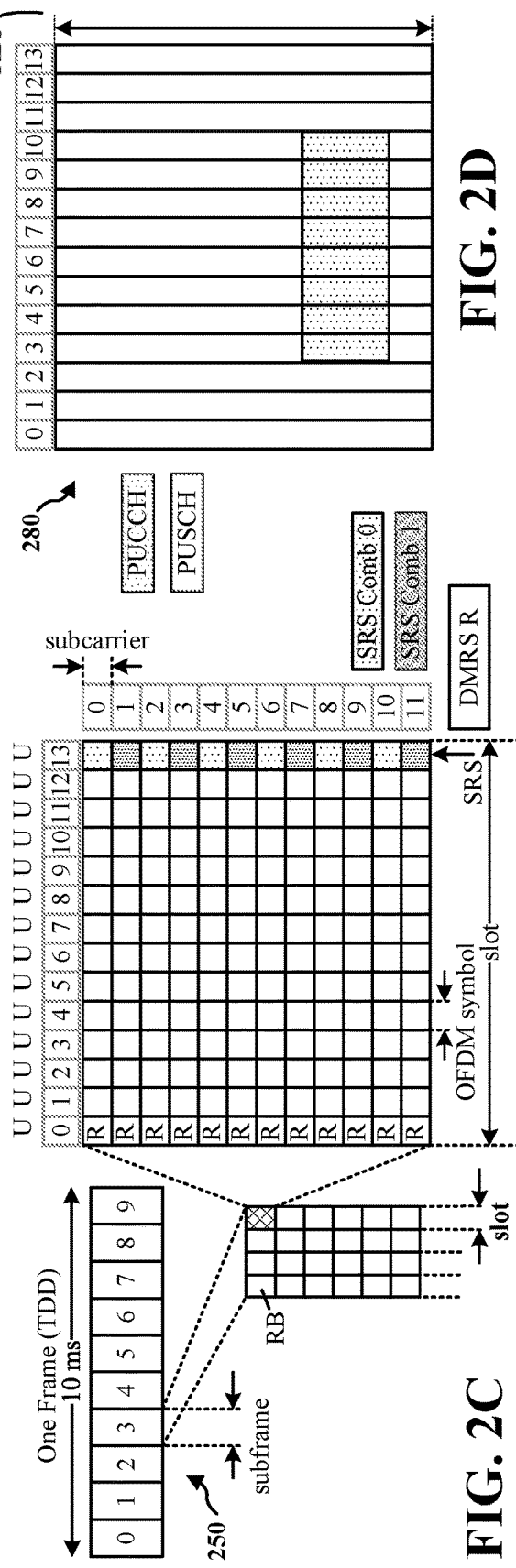
FIG. 2C
FIG. 2D

PROCEDURAL DELAYS AND SCHEDULING RESTRICTION BASED ON COMPONENT CARRIER GROUPS

CROSS REFERENCE TO RELATED APPLICATION(S)

This application claims the benefit of U.S. Provisional Application Ser. No. 62/938,263, entitled "Procedural Delays and Scheduling Restriction based on Component Carrier Groups" and filed on Nov. 20, 2019, which is expressly incorporated by reference herein in its entirety.

BACKGROUND

Technical Field

The present disclosure relates generally to communication systems, and more particularly, to procedural delays and scheduling restrictions based on component carrier (CC) groups.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, a transmission including an indication to change at least one of a transmission configuration indication (TCI) state for multiple component carriers (CCs), a spatial relation for the multiple CCs, or a pathloss reference signal (PL RS) for the multiple CCs. The apparatus switches beams in response to the transmission, where timing of the switching is based on a grouping of the multiple CCs.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a transmission including an indication to change at least one of a TCI state for multiple CCs sharing a same beam, a spatial relation for the multiple CCs, or a PL RS for the multiple CCs. The apparatus schedules communication for the UE based on at least one of a receive time difference (RTD) between a first CC and a second CC or the TCI state being an unknown TCI state for at least one CC of the multiple CCs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
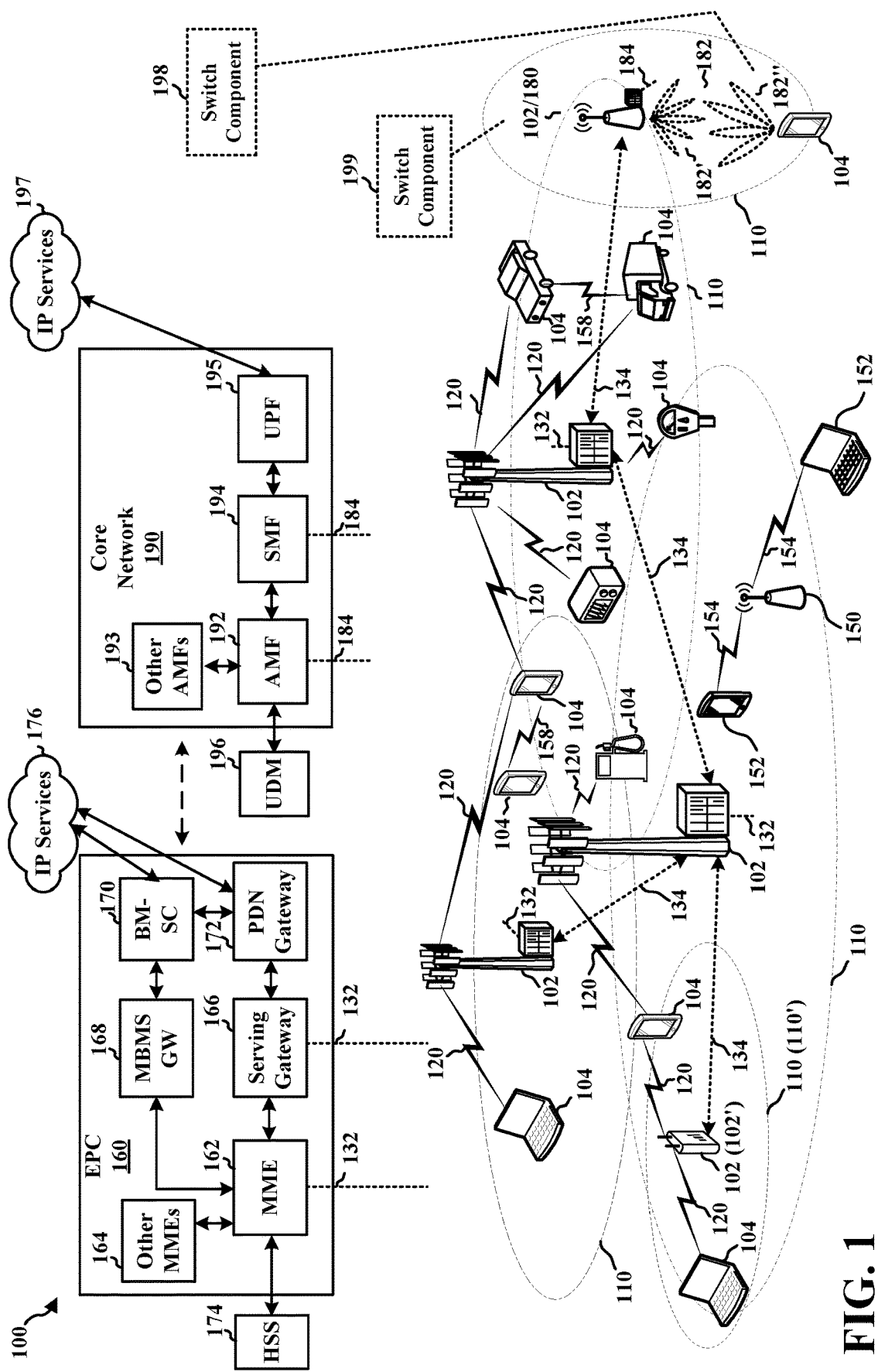
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to switch beams of respective CCs based on certain factors (e.g., RTD or TCI states), and not switch the beams simultaneously. For example, the UE 104 of FIG. 1 may include a switch component 198 configured to switch beams in response to a transmission from a base station. The UE 104 may receive, from a base station, a transmission including an indication to change at least one of a TCI state for multiple CCs, a spatial relation for the multiple CCs, or a pathloss reference signal (PL RS) for the multiple CCs. The UE 104 may switch beams in response to the transmission. The timing of the switching may be based on a grouping of the multiple CCs.

Referring again to FIG. 1, in certain aspects, the base station 102/180 may be configured to provide an indication to a UE to switch beams of respective CCs based on certain factors (e.g., RTD or TCI states). For example, the base station 102/180 of FIG. 1 may include an indication component 199 configured to transmit the indication, to the UE 104. The base station 102/180 may transmit, to the UE, a transmission including an indication to change at least one of a TCI state for multiple CCs sharing a same beam, a spatial relation for the multiple CCs, or a PL RS for the multiple CCs. The base station 102/180 may schedule communication for the UE based on at least one of the RTD between a first CC and a second CC or the TCI state being an unknown TCI state for at least one CC of the multiple CCs Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
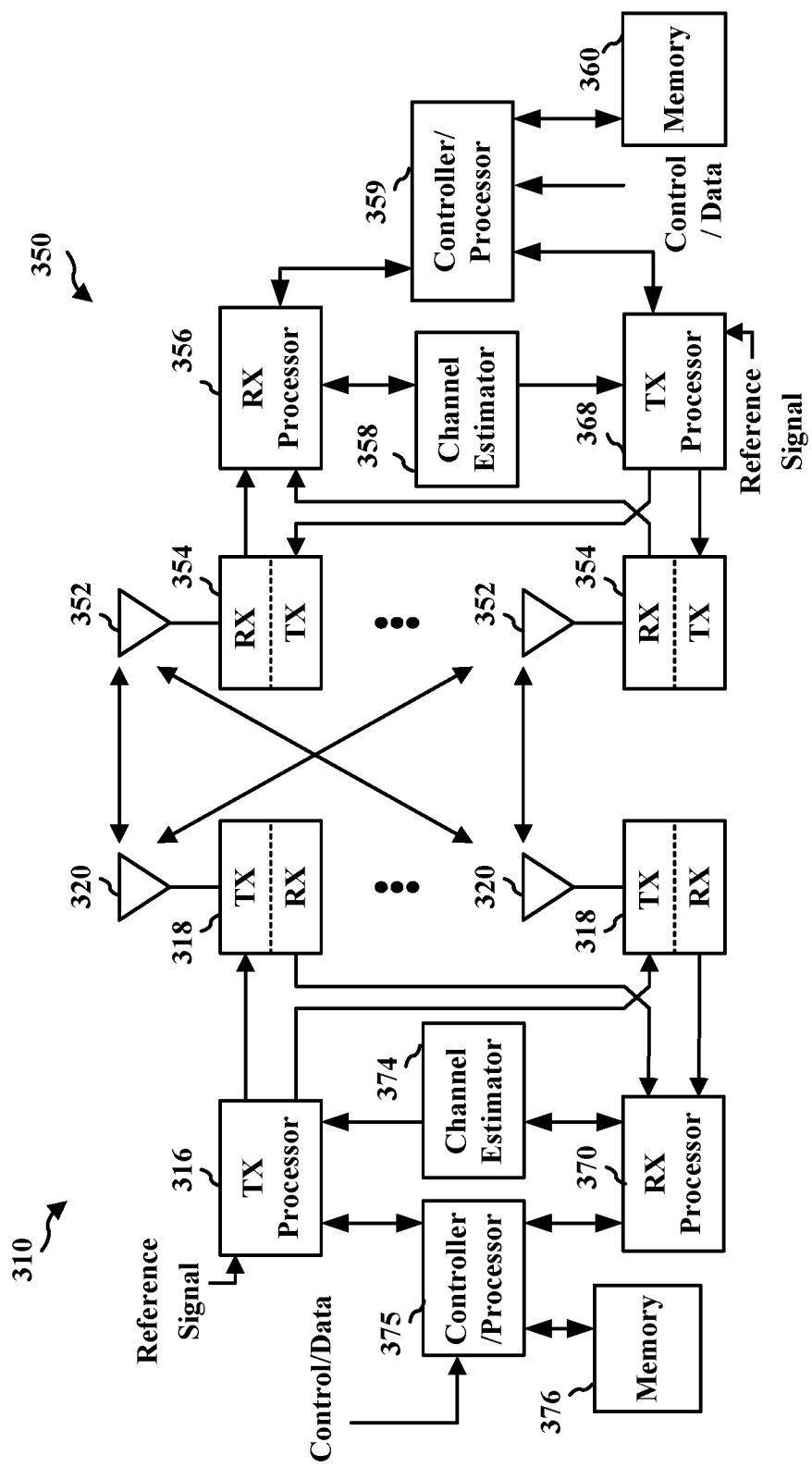
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
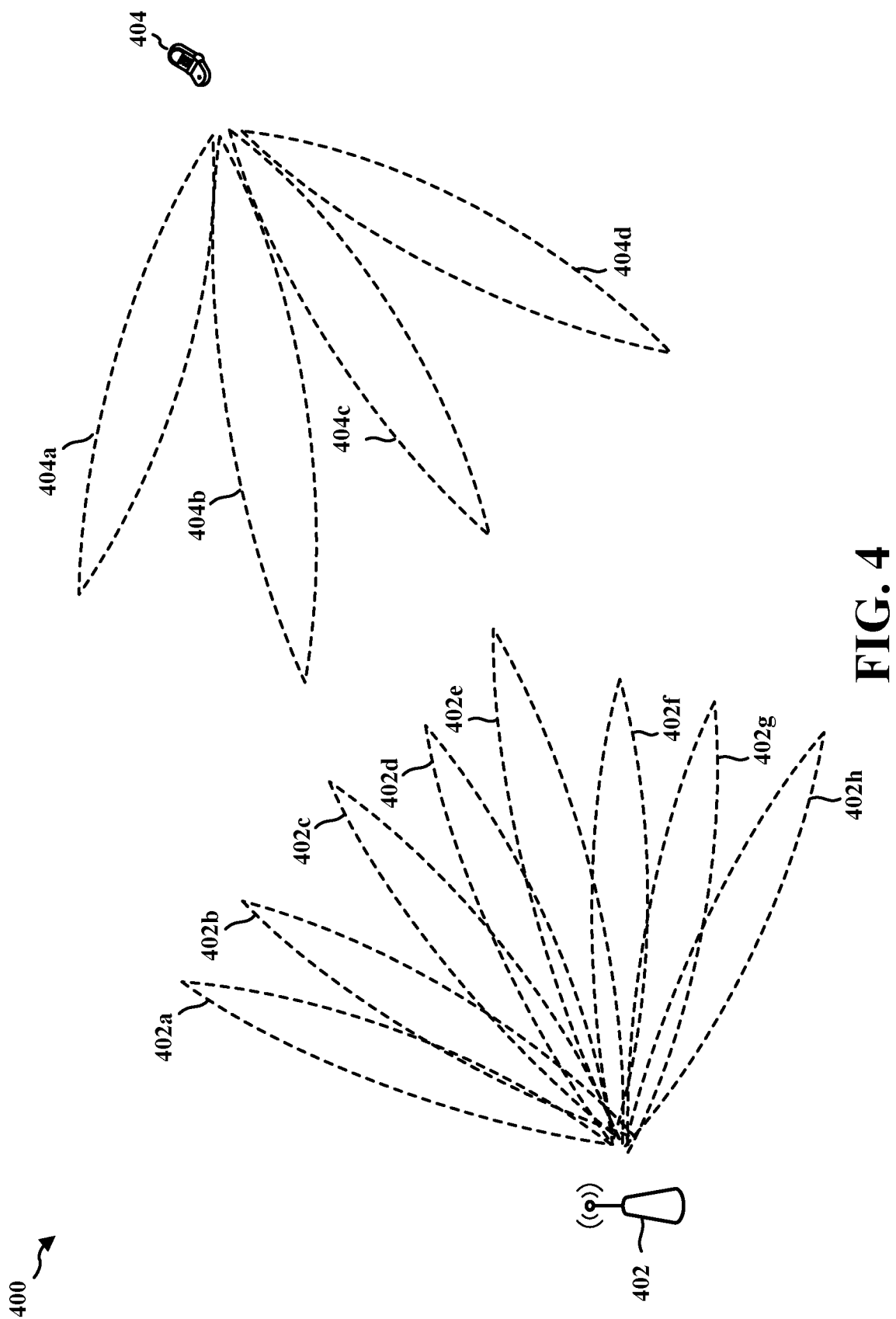
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 402 may determine to switch beams, e.g., between beams 402a-402h. The beam at the UE 402 may be used for reception of downlink communication and/or transmission of uplink communication. In some examples, the base station 404 may send a transmission that triggers a beam switch by the UE 402. For example, the base station 404 may indicate a transmission configuration indication (TCI) state change, and in response, the UE 402 may switch to a new beam for the new TCI state of the base station 404. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

In another aspect, a spatial relation change, such as a spatial relation update, may trigger the UE to switch beams. Beamforming may be applied to uplink channels, such as but not limited to PUCCH. Beamforming may require configuring one or more spatial relations between the uplink and downlink signals. Spatial relation indicates that a UE may transmit the uplink signal using the same beam as it used for receiving the corresponding downlink signal.

In another aspect, the base station 404 may change a pathloss reference signal configuration that the UE uses to determine power control for uplink transmissions, such as SRS, PUCCH, and/or PUSCH. In response to the change in the pathloss reference signal, the UE 402 may determine to switch to a new beam.

The UE 402 may operate using carrier aggregation, and may be configured to communicate with the network via a base station 404 utilizing multiple component carriers. For example, the UE 402 may communicate with the base station 404 using a primary cell (PCell) and a secondary cell (SCell). Carrier aggregation may allow the UE 402 to transmit and/or receive data, simultaneously, on multiple component carriers (CCs) from a single base station 404.

Each aggregated carrier may be referred to as a component carrier (CC). Carrier aggregation may also allow the UE 402 to communicate on one or more concurrent beams. The UE may partition the CCs into different groups under carrier aggregation. For example, CCs in the same group may use the same beam, while CCs in a different group may use different beams or independent beams. For example, a UE supporting three carriers and two beams may group a first and second CC into a group using the first beam and a third CC may use the second beam.

Carriers within carrier aggregation may arrive at the UE at the same time or at a different time. The difference in timing between receipt of CCs may be referred to as the receive time difference (RTD). The difference in timing may be capped to a maximum value, e.g., a maximum receive time difference (MRTD).

Some TCI states may be known and others may be unknown. A TCI state may correspond to a known TCI state if the UE has provided a measurement report for the reference signal (RS) corresponding to the TCI state to the network. For example, the UE may have measured a RS for a particular TCI state and may provide a L1 received signal reference power (RSRP) report about the measured RS to the network. If the UE has provided the report for the TCI state within a period of time, such as within the previous 1280 ms, the TCI state may be considered a known TCI state. If the UE has not provided such report, or provided a report outside the period of time, then the TCI state may be considered unknown. A TCI state may be known for one CC and unknown for another CC of the UE.

The present disclosure relates to improving the manner in which a UE switches beams for multiple CCs. In some aspects, the UE may switch beams for multiple CCs at a same time if the CCs are grouped within a group that shared a same beam. If the CCs are in different groups of CCs, where each group uses an independent beam, the UE may switch the beams for the CCs at different times. The times may be based on factors, such as a RTD between the two CCs, whether a new TCI state triggering the beam switch is known or unknown, etc. Additionally or alternatively, the base station may schedule communication after triggering a beam switch for multiple CCs based on factors such as an RTD, whether a new TCI state is known or unknown, etc. For example, the base station may use a guard period or may wait to schedule communication for at least one CC.

Figure 5:
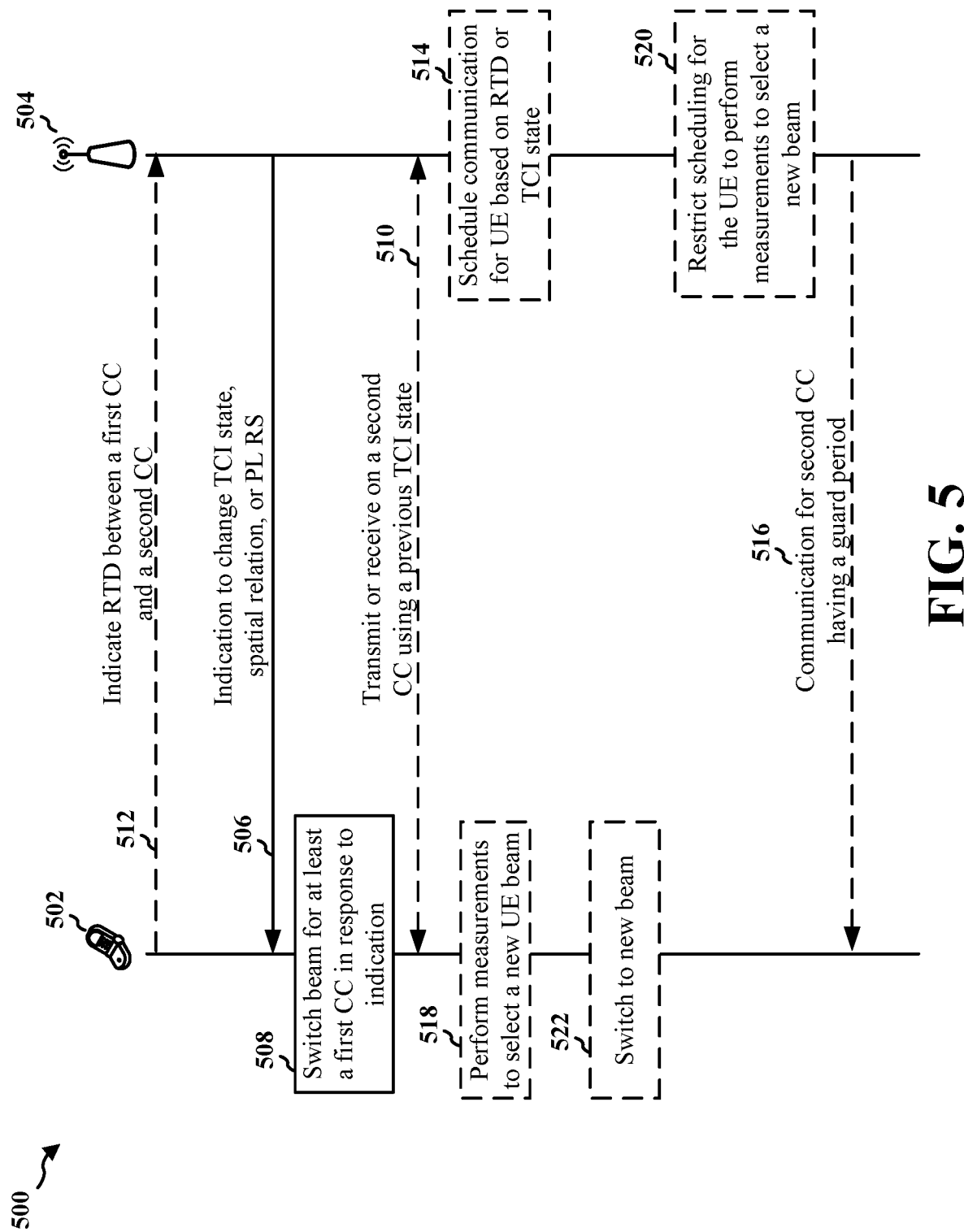
FIG. 5 is a call flow diagram of signaling between a UE and a base station in accordance with certain aspects of the disclosure.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350. Optional aspects are illustrated with a dashed line.

As illustrated at 506, the base station 504 may transmit, to the UE 502, a transmission including an indication to change for a TCI state for multiple CCs sharing a same beam, a spatial relation for the multiple CCs, and/or a pathloss reference signal (PL RS) for the multiple CCs. The UE 502 may receive the transmission 506 from the base station 504. The indication may trigger the UE 502 to switch beams for the CCs.

As illustrated at 508, the UE 502 may switch beams in response to the transmission. The timing of the switching of the beams may be based on a grouping of the multiple CCs. In some aspects, the UE 502 may switch the beams at different times if the multiple CCs are in different groups of CCs. The CCs may be grouped with each group using a different beam. The switch at 508, may be for a first CC, and a second CC that is in a different group than the first CC may switch beams at a later time, such as for example at 522.

In some aspects, the different times at which different CCs are switched may be based on a RTD between the CCs. The UE 502 may switch a first CC using a first beam at a first time, e.g., at 508, and may switch a second CC using a second beam at a second time, e.g., at 522. The second time may be spaced from the first time based on the RTD between the first CC and the second CC. For example, if the second CC is 20 μs being the first CC, the UE 502 may switch beams on the second CC at least 20 μs after switching beams on the first CC.

In some aspects, the different times may be based on a known TCI state or an unknown TCI state. A UE 502 may provide an L1 RSRP report to the network for a particular TCI state. The measurement report may include a measurement of a reference signal corresponding to the TCI state. The TCI state may be considered a known TCI state if the UE 502 has provided a measurement report to the network for the TCI state within a period of time. As an example to illustrate the concept, a known TCI state may be a TCI state for which the UE has transmitted a measurement report to the network within the previous 1280 ms. The UE 502 may switch a first CC using a first beam at a first time, e.g., 508, and may switch a second CC using a second beam at a second time, e.g., 522. The second time may be spaced after the first time based on a new TCI state for the second CC being the unknown TCI state. For example, a known switch time may be 2 ms. An unknown switch time may be 2 ms+8*system measurement time configuration (SMTC). In this example, the UE 502 may switch the beam for the first CC, at 508, 2 ms after receiving the indication and may switch the beam for the second CC, at 522, 2 ms+8*SMTC. This example length of time is merely to illustrate the concept that the beam switch for the second CC may follow after the beam switch for the first CC by taking into account a measurement time for the TCI state being unknown for the second CC.

In some aspects, for example as illustrated at 510, the UE 502, may transmit or receive on the second CC using a previous TCI state until the beam switch is performed for the second CC. In the example in which the time difference is based on the TCI state being unknown for the second CC, the UE 502 may continue to use the prior beam for the second CC during the period of time 2 ms+8*SMTC. If the time difference between the beam switches is based on an RTD between the two CCs, the UE 502 may continue to use the prior beam for the second CC during an amount of time corresponding to the RTD.

In some aspects, for example as illustrated at 512, the UE 502 may provide an indication of a RTD between a first CC and a second CC to the base station 504. The base station 504 may use the RTD to schedule the UE 502 when a beam switch will occur, such as to provide a guard period.

In some aspects, the UE 502 may switch the beams simultaneously if the multiple CCs are in a group of CCs. For example, multiple CCs in a group of CCs that each use a same beam may be switched at 508 and/or the multiple CCs may be switched at 522. Each CC in the group of CCs may use the same beam. If the UE 502 switched both CCs at the same time, the base station 504, at 514, may schedule communication for the UE based on at least one of an RTD between the first CC and the second CC or the TCI state being an unknown TCI state for at least one CC of the multiple CCs.

In some aspects, the base station 504 may apply a guard period when communicating with the UE 502 on a second CC to account for factors such as a RTD between the first CC and the second CC. In some aspects, for example at 512, if the base station 504 has received an indication of the RTD from the UE 502, the base station 504 may schedule a communication for a second CC using a guard period based on the RTD between the first and second CCs. In some aspects, the base station 504 may not schedule or assume that the UE 502 may not receive/transmit during the guard period. In some aspects, the base station 504 may schedule the communication for the UE 502 using a guard period based on a maximum RTD, e.g., if the actual RTD has not been received from the UE 502 or is not known.

In some aspects, for example as illustrated at 516, the UE 502 may receive communication from the base station 504 for the second CC having a guard period based on the RTD. During the guard period, the base station 504 may refrain from scheduling the second CC. Therefore, the base station 504 may not transmit using the second CC and may not expect the UE 502 to transmit on the second CC during the guard period.

In some aspects, the TCI state may be a known state for the first CC and the unknown state for the second CC. In some aspects, the UE 502 may switch to a beam based on the known state for the first CC even though the TCI state is unknown for the other CC. For example, at 508, the UE 502 may switch the beam for the first CC and the second CC based on the known TCI state for the first CC. In such instances, the base station 504 may schedule the communication for the UE 502 on the second CC after transmission of a reference signal on the second CC using the TCI state, e.g., after an amount of time including switching time+ measurement time for an unknown TCI state, e.g., 2 ms+8*SMTC in the example above.

In some aspects, for example as illustrated at 518, the UE 502 may perform measurements to select the new UE beam based on the TCI state for each of the CCs in the group of CCs using the same beam. In some aspects, the TCI state may be an unknown state for at least one of the multiple CCs. The TCI state may be unknown for each of the CCs, or the TCI state may be known for at least one of the CCs in the group of CCs sharing a same beam. Even though the TCI state is known for at least one CC, the UE 502 may perform measurements to select the new beam that is a best combined beam for all of the CCs in the group before performing the beam switch.

In some aspects, for example as illustrated at 520, while the UE 502 is performing measurements at 518, the base station 504 may restrict scheduling during a period of time for the UE 502 to perform measurements to select a new beam based on the TCI state. The base station 504 may restrict scheduling in instances where the TCI state is unknown state for at least one of the multiple CCs. In some aspects, restricting the scheduling may include limiting scheduling to a CC for which the TCI state is a known state during the period of time. In some aspects, restricting the scheduling may include avoiding scheduling communication on each of the multiple CCs when a reference signal for measurement is transmitted. The base station 504 may apply a scheduling restriction by not scheduling the UE 502 on any CC within a particular group when RSs for measurement are being transmitted for a CC in the group.

In some aspects, for example as illustrated at 522, the UE 502 may switch to the new beam. The UE 502 may switch to the new beam after performing the measurements at 518 to select the new UE beam. In some aspects, the TCI state may be a known state for the first CC and the TCI state may be an unknown state for a second CC. In such aspects, the UE 502 may switch to a new beam selected using the known state for the first CC.

Figure 6:
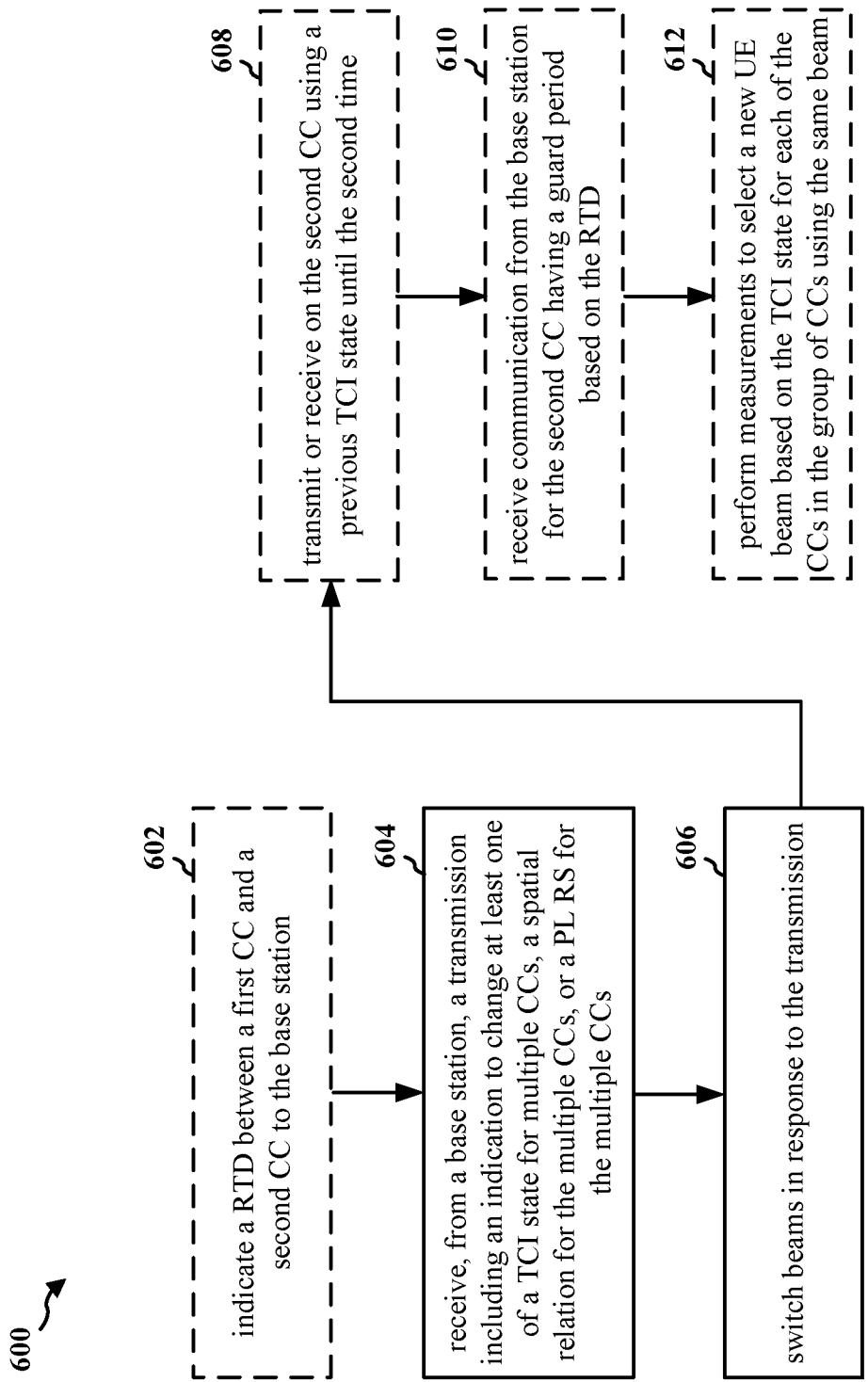
FIG. 6 is a flowchart of a method of wireless communication.

FIG. 6 is a flowchart 600 of a method of wireless communication. The method may be performed by a UE or a component of a UE (e.g., the UE 104, 404, 502; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may enable a UE to switch beams of respective CCs based on certain factors (e.g., RTD or TCI states), and not switch the beams simultaneously.

In some aspects, for example at 602, the UE may indicate a RTD between a first CC and a second CC. For example, 602 may be performed by RTD component 740 of apparatus 702. The UE may indicate the RTD between the first CC and the second CC to the base station.

At 604, the UE may receive, from a base station, a transmission including an indication. For example, 604 may be performed by indication component 742 of apparatus 702. The transmission may include the indication to change at least one of a TCI state for multiple CCs, a spatial relation for the multiple CCs, or a PL RS for the multiple CCs.

At 606, the UE may switch beams in response to the transmission. For example, 606 may be performed by switch component 744 of apparatus 702. The timing of the switching of the beams may be based on a grouping of the multiple CCs. In some aspects, the UE may switch the beams at different times if the multiple CCs are in different groups of CCs. Each of the groups of CCs may use a different beam. In some aspects, the different times may be based on a RTD between the different groups of CCs. The UE may switch a first CC using a first beam at a first time and may switch a second CC using a second beam at a second time. The second time may be spaced from the first time based on the RTD between the first CC and the second CC. In some aspects, the different times may be based on a known TCI state or an unknown TCI state. The UE may switch a first CC using a first beam at a first time and may switch a second CC using a second beam at a second time. The second time may be spaced after the first time based on a new TCI state for the second CC being the unknown TCI state. In some aspects, the UE may switch the beams simultaneously if the multiple CCs are in a group of CCs. Each CC in the group of CCs may use the same beam. In some aspects, the TCI state may be a known state for the first CC and the TCI state may be an unknown state for a second CC. In such aspects, the UE may switch to a new beam selected using the known state for the first CC.

In some aspects, for example at 608, the UE may transmit or receive on the second CC using a previous TCI state. For example, 608 may be performed by CC component 746 of apparatus 702. The UE may transmit or receive on the second CC using the previous TCI state until the second time.

In some aspects, for example at 610, the UE may receive communication from the base station for the second CC. For example, 610 may be performed by guard period component 748 of apparatus 702. The received communication may include a guard period based on the RTD. During the guard period, the UE does not receive or transmit on the CC that is not symbol or slot aligned to the switch. For example, if the UE is switching based on a first CC, then the second CC may not be able to receive or transmit on the symbols within the RTD of the switch.

Figure 7:
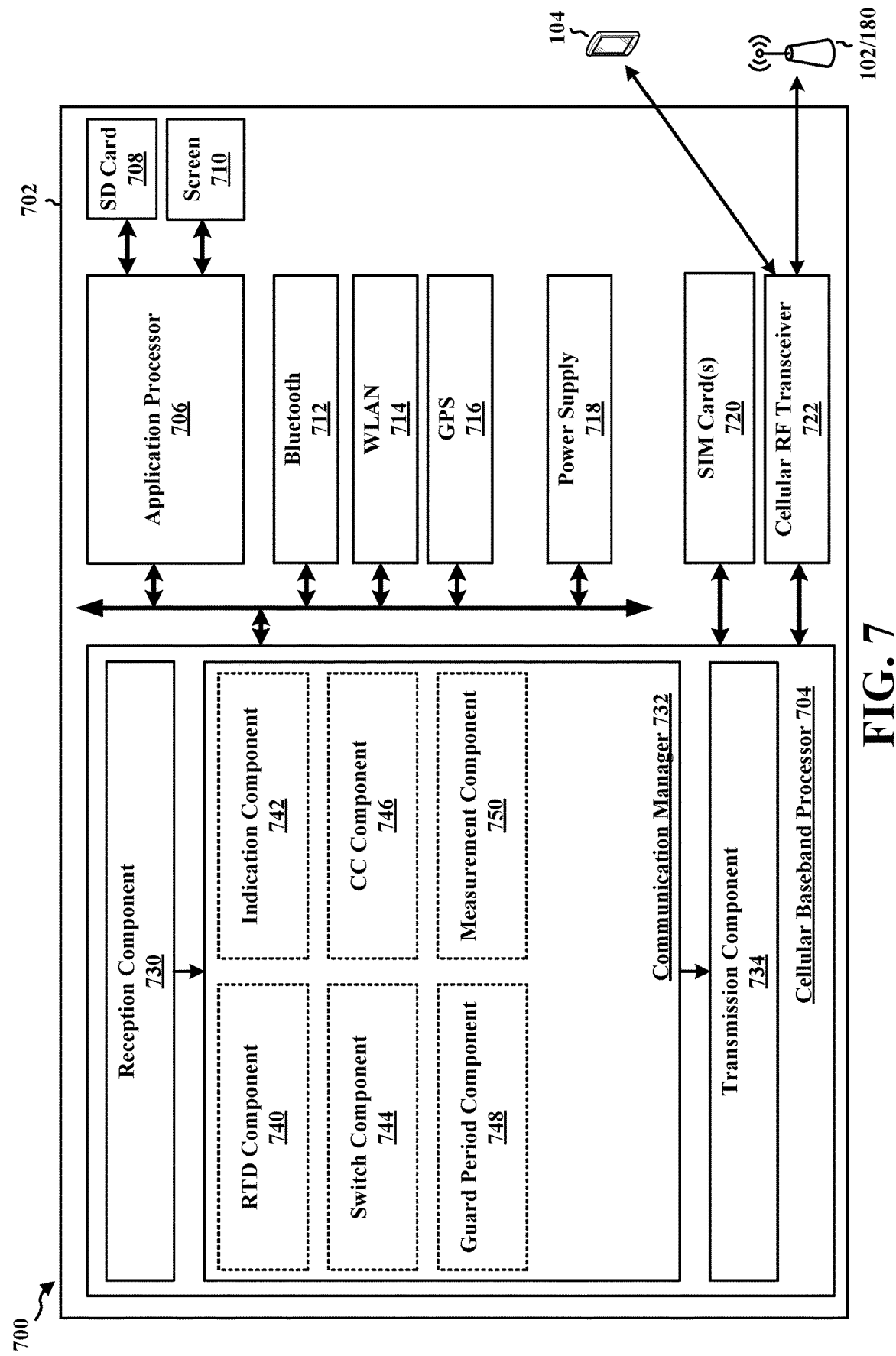
FIG. 7 is a diagram illustrating an example of a hardware implementation for an example apparatus.

In some aspects, for example, at 612, the UE may perform measurements to select new UE beam. For example, 612 may be performed by measurement component 750 of apparatus 702. The UE may perform measurements to select the new UE beam based on the TCI state for each of the CCs in the group of CCs using the same beam. The UE may switch to the new UE beam after performing the measurements. In some aspects, the TCI state may be an unknown state for at least one of the multiple CCs FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the aforediscussed additional modules of the apparatus 702.

The communication manager 732 includes an RTD component 740 that is configured to indicate a RTD between a first CC and a second CC, e.g., as described in connection with 602 of FIG. 6. The communication manager 732 further includes an indication component 742 that is configured to receive a transmission including an indication, e.g., as described in connection with 604 of FIG. 6. The communication manager 732 further includes a switch component 744 that is configured to switch beams in response to the transmission, e.g., as described in connection with 606 of FIG. 6. The communication manager 732 further includes a CC component 746 that is configured to transmit or receive on the second CC using a previous TCI state, e.g., as described in connection with 608 of FIG. 6. The communication manager 732 further includes a guard period component 748 that is configured to receive communication from the base station for the second CC, e.g., as described in connection with 610 of FIG. 6. The communication manager 732 further includes a measurement component 750 that is configured to perform measurements to select new UE beam, e.g., as described in connection with 612 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving, from a base station, a transmission including an indication to change at least one of a TCI state for multiple CCs, a spatial relation for the multiple CCs, or a PL RS for the multiple CCs. The apparatus includes means for switching beams in response to the transmission, wherein timing of the switching is based on a grouping of the multiple CCs. The apparatus further includes means for transmitting or receiving on the second CC using a previous TCI state until the second time. The apparatus further includes means for indicating a RTD between a first CC and a second CC to the base station. The apparatus further includes means for receiving communication from the base station for the second CC after a guard period based on the RTD. The apparatus further includes means for performing measurements to select a new UE beam based on the TCI state for each of the CCs in the group of CCs using the same beam. The UE switches to the new UE beam after performing the measurements. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
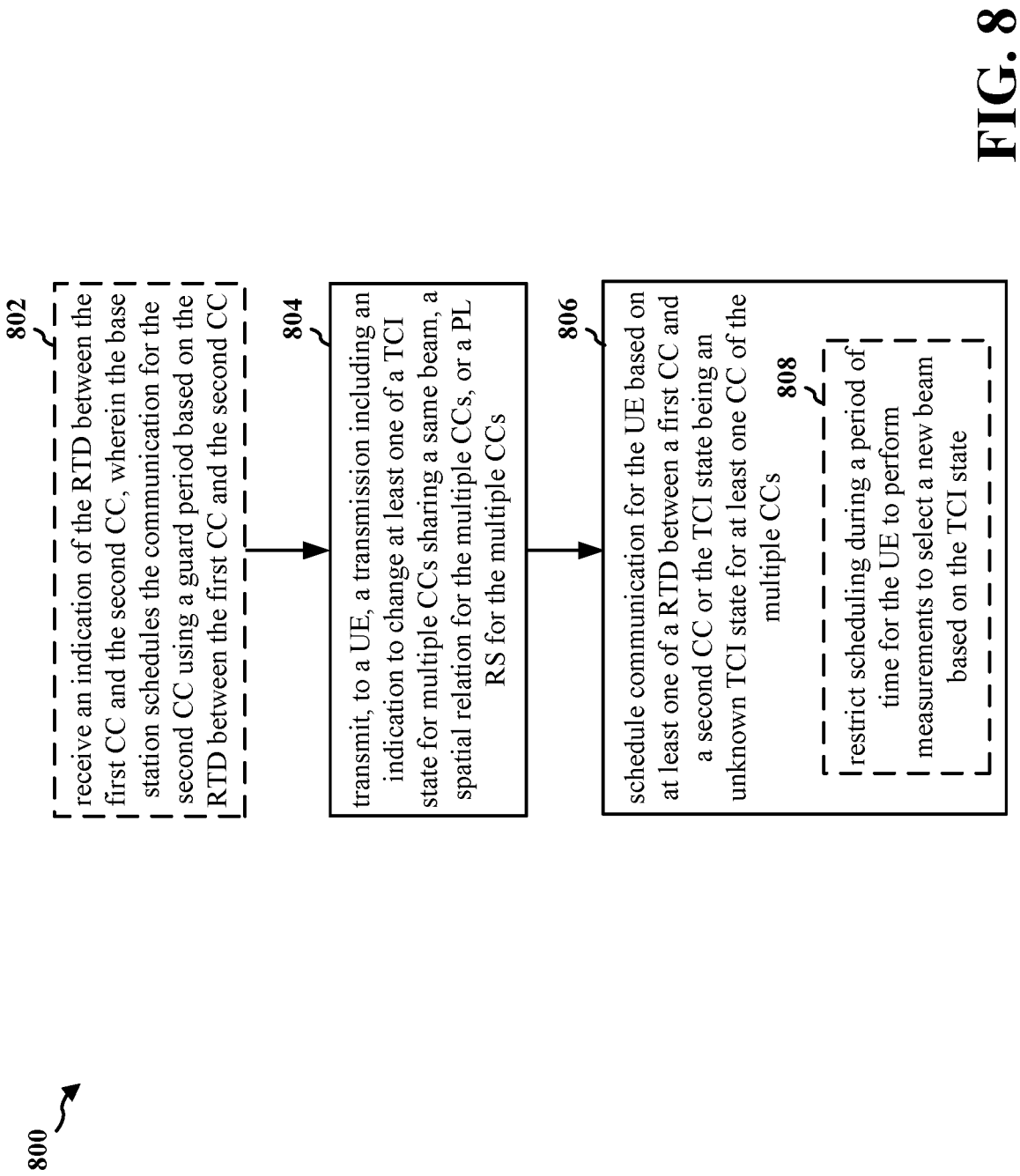
FIG. 8 is a flowchart of a method of wireless communication.

FIG. 8 is a flowchart 800 of a method of wireless communication. The method may be performed by a base station or a component of a base station (e.g., the base station 102/180; the apparatus 902; the baseband unit 904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to provide an indication to a UE to switch beams of respected CCs based on certain factors (e.g., RTD or TCI states).

In some aspects, for example at 802, the base station may receive, from a UE, an indication of the RTD between the first CC and the second CC. For example, 802 may be performed by RTD component 940 of apparatus 902. The base station may schedule the communication for the second CC using a guard period based on the RTD between the first CC and the second CC. In some aspects, the base station may not schedule or assume that the UE may not receive/transmit during the guard period.

At 804, the base station may transmit, to a UE, a transmission including an indication. For example, 804 may be performed by indication component 942 of apparatus 902. The transmission may include the indication to change at least one of a TCI state for multiple CCs sharing a same beam, a spatial relation for the multiple CCs, or a PL RS for the multiple CCs.

At 806, the base station may schedule communication for the UE. For example, 806 may be performed by schedule component 944 of apparatus 902. The base station may schedule the communication for the UE based on at least one of a RTD between the first CC and the second CC or the TCI state being an unknown TCI state for at least one CC of the multiple CCs. In some aspects, the base station may schedule the communication for the UE using a guard period based on a maximum RTD. In some aspects, the TCI state may be a known state for the first CC and the unknown state for the second CC. In such instances, the base station schedules the communication for the UE on the second CC after transmission of a reference signal on the second CC using the TCI state.

In some aspects, for example, at 808, the base station may restrict scheduling during a period of time for the UE to perform measurements to select a new beam based on the TCI state. For example, 908 may be performed by schedule component 944 of apparatus 902. The base station may restrict scheduling in instances where the TCI state is unknown state for at least one of the multiple CCs. In some aspects, restricting the scheduling may include limiting scheduling to a CC for which the TCI state is a known state during the period of time. In some aspects, restricting the scheduling may include avoiding scheduling communication on each of the multiple CCs when a reference signal for measurement is transmitted.

Figure 9:
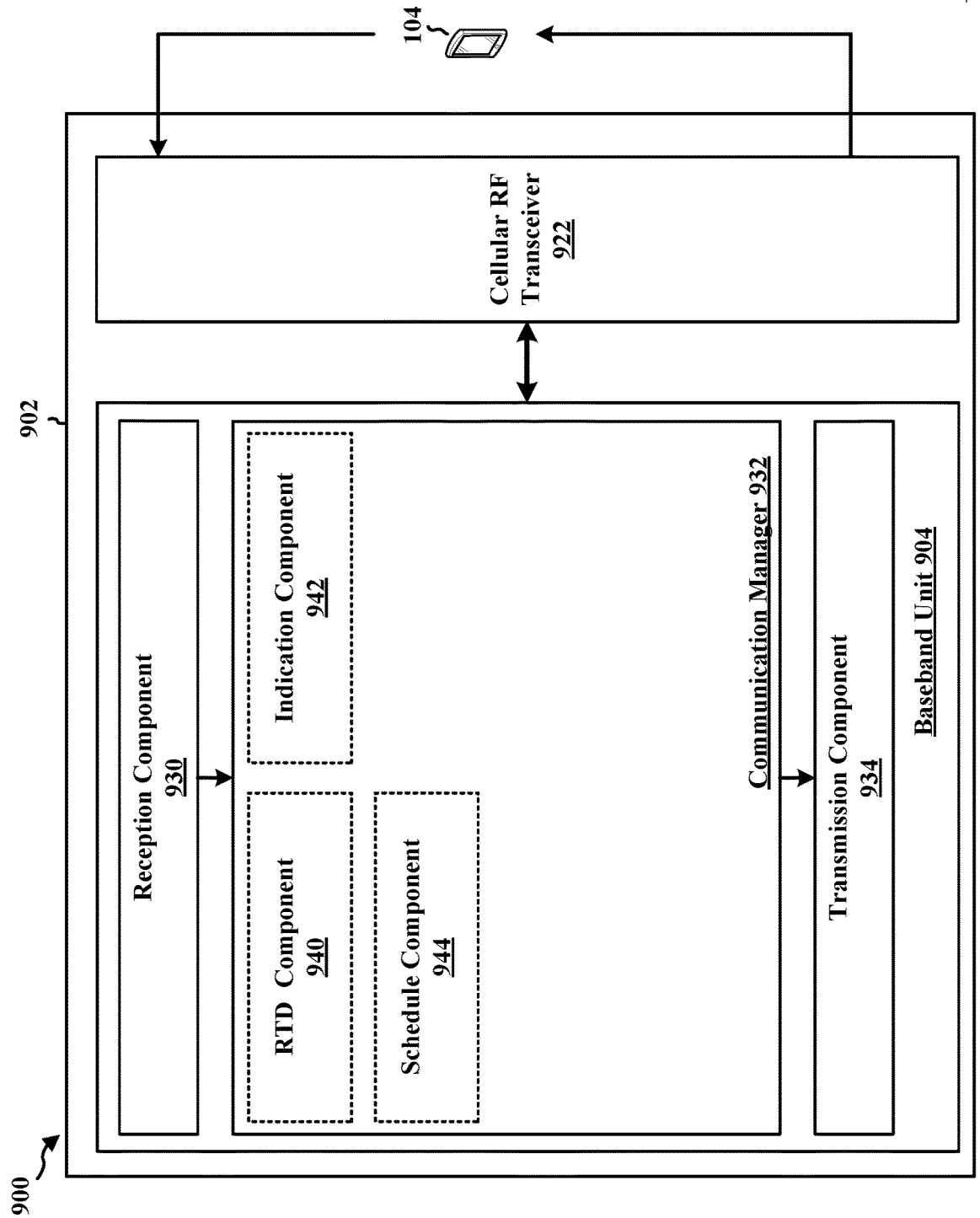
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes an RTD component 940 that may receive, from a UE, an indication of the RTD between the first CC and the second CC, e.g., as described in connection with 802 of FIG. 8. The communication manager 932 further includes an indication component 942 that may transmit, to a UE, a transmission including an indication, e.g., as described in connection with 804 of FIG. 8. The communication manager 932 further includes a schedule component 944 that may schedule communication for the UE, e.g., as described in connection with 806 of FIG. 8. The schedule component 944 may be configured to restrict scheduling during a period of time for the UE to perform measurements to select a new beam based on the TCI state, e.g., as described in connection with 808 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE, a transmission including an indication to change at least one of a TCI state for multiple CCs sharing a same beam, a spatial relation for the multiple CCs, or a PL RS for the multiple CCs. The apparatus includes means for scheduling communication for the UE based on at least one of a RTD between a first CC and a second CC or the TCI state being an unknown TCI state for at least one CC of the multiple CCs. The apparatus further includes means for receiving an indication of the RTD between the first CC and the second CC, wherein the base station schedules the communication for the second CC after a guard period based on the RTD between the first CC and the second CC. The apparatus further includes means for restricting scheduling during a period of time for the UE to perform measurements to select a new beam based on the TCI state. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising receiving, from a base station, a transmission including an indication to change at least one of a TCI state for multiple CCs, a spatial relation for the multiple CCs, or a PL RS for the multiple CCs; and switching beams in response to the transmission, wherein timing of the switching is based on a grouping of the multiple CCs.

In Aspect 2, the method of Aspect 1 further includes that the UE switches the beams at different times if the multiple CCs are in different groups of CCs, each group of CCs using a different beam.

In Aspect 3, the method of Aspect 1 or 2 further includes that the different times are based on a RTD between the different groups of CCs.

In Aspect 4, the method of any of Aspects 1-3 further includes that the UE switches a first CC using a first beam at a first time and switches a second CC using a second beam at a second time, wherein the second time is spaced from the first time based on the RTD between the first CC and the second CC.

In Aspect 5, the method of any of Aspects 1-4 further includes that the different times are based on a known TCI state or an unknown TCI state.

In Aspect 6, the method of any of Aspects 1-5 further includes that the UE switches a first CC using a first beam at a first time and switches a second CC using a second beam at a second time, wherein the second time is spaced after the first time based on a new TCI state for the second CC being the unknown TCI state.

In Aspect 7, the method of any of Aspects 1-6 further includes transmitting or receiving on the second CC using a previous TCI state until the second time.

In Aspect 8, the method of any of Aspects 1-7 further includes that the UE switches the beams simultaneously if the multiple CCs are in a group of CCs, wherein each CC in the group of CCs use a same beam.

In Aspect 9, the method of any of Aspects 1-8 further includes indicating a RTD between a first CC and a second CC to the base station; and receiving communication from the base station for the second CC after a guard period based on the RTD.

In Aspect 10, the method of any of Aspects 1-9 further includes that the TCI state is a known state for a first CC and an unknown state for a second CC, and wherein the UE switches to a new beam selected using the known state for the first CC.

In Aspect 11, the method of any of Aspects 1-10 further includes that the TCI state is an unknown state for at least one of the multiple CCs, further includes performing measurements to select a new UE beam based on the TCI state for each of the CCs in the group of CCs using the same beam, wherein the UE switches to the new UE beam after performing the measurements.

Aspect 12 is a device including one or more processors and one or more memories in electronic communication with the one or more processors storing instructions executable by the one or more processors to cause the system or apparatus to implement a method as in any of Aspects 1-11.

Aspect 13 is a system or apparatus including means for implementing a method or realizing an apparatus as in any of Aspects 1-11.

Aspect 14 is a non-transitory computer readable medium storing instructions executable by one or more processors to cause the one or more processors to implement a method as in any of Aspects 1-11.

Aspect 15 is a method of wireless communication at a base station comprising transmitting, to a UE, a transmission including an indication to change at least one of a TCI state for multiple CCs sharing a same beam, a spatial relation for the multiple CCs, or a PL RS for the multiple CCs; and scheduling communication for the UE based on at least one of a RTD between a first CC and a second CC or the TCI state being an unknown TCI state for at least one CC of the multiple CCs.

In Aspect 16, the method of Aspect 15 further includes receiving an indication of the RTD between the first CC and the second CC, wherein the base station schedules the communication for the second CC after a guard period based on the RTD between the first CC and the second CC.

In Aspect 17, the method of Aspect 15 or 16 further includes that the base station schedules the communication for the UE using a guard period based on a maximum RTD.

In Aspect 18, the method of any of Aspects 15-17 further includes that the TCI state is a known state for the first CC and the unknown state for the second CC, and wherein the base station schedules the communication for the UE on the second CC after transmission of a reference signal on the second CC using the TCI state.

In Aspect 19, the method of any of Aspects 15-18 further includes that the TCI state is the unknown state for at least one of the multiple CCs, and wherein scheduling communication for the UE further includes restricting scheduling during a period of time for the UE to perform measurements to select a new beam based on the TCI state.

In Aspect 20, the method of any of Aspects 15-19 further includes that restricting the scheduling includes limiting scheduling to a CC for which the TCI state is a known state during the period of time.

In Aspect 21, the method of any of Aspects 15-20 further includes that restricting the scheduling includes avoiding scheduling communication on each of the multiple CCs when a reference signal for measurement is transmitted.

Aspect 22 is a device including one or more processors and one or more memories in electronic communication with the one or more processors storing instructions executable by the one or more processors to cause the system or apparatus to implement a method as in any of Aspects 15-21.

Aspect 23 is a system or apparatus including means for implementing a method or realizing an apparatus as in any of Aspects 15-21.

Aspect 24 is a non-transitory computer readable medium storing instructions executable by one or more processors to cause the one or more processors to implement a method as in any of Aspects 15-21.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving, from a base station, a transmission including an indication to change at least one of a transmission configuration indication (TCI) state for multiple component carriers (CCs), a spatial relation for the multiple CCs, or a pathloss reference signal (PL RS) for the multiple CCs; and
   switching beams in response to the transmission, wherein timing of the switching is based on a grouping of the multiple CCs, wherein the UE switches a first CC using a first beam at a first time and switches a second CC using a second beam at a second time, wherein the second time is spaced from the first time based on at least one of a receive time difference (RTD) between the first CC and the second CC or a new TCI state for the second CC being an unknown TCI state.

2. The method of claim 1, wherein the UE switches the beams at different times if the multiple CCs are in different groups of CCs, each group of CCs using a different beam.

3. The method of claim 2, wherein the different times are based on the RTD between the different groups of CCs.

4. The method of claim 2, wherein the different times are based on a known TCI state or the unknown TCI state.

5. The method of claim 1, wherein the second time is spaced from the first time based on the RTD between the first CC and the second CC.

6. The method of claim 1, wherein the second time is spaced after the first time based on the new TCI state for the second CC being the unknown TCI state.

7. The method of claim 6, further comprising:
   transmitting or receiving on the second CC using a previous TCI state until the second time.

8. The method of claim 1, wherein the UE switches the beams simultaneously if the multiple CCs are in a group of CCs, wherein each CC in the group of CCs use a same beam.

9. The method of claim 8, wherein the TCI state is a known state for the first CC and an unknown state for the second CC, and wherein the UE switches to a new beam selected using the known state for the first CC.

10. The method of claim 8, wherein the TCI state is an unknown state for at least one of the multiple CCs, the method further comprising:
    performing measurements to select a new UE beam based on the TCI state for each of the CCs in the group of CCs using the same beam, wherein the UE switches to the new UE beam after performing the measurements.

11. A method of wireless communication at a user equipment (UE), comprising:
    indicating a receive time difference (RTD) between a first CC and a second CC to a base station;
    receiving, from the base station, a transmission including an indication to change at least one of a transmission configuration indication (TCI) state for multiple component carriers (CCs), a spatial relation for the multiple CCs, or a pathloss reference signal (PL RS) for the multiple CCs;
    switching beams in response to the transmission, wherein timing of the switching is based on a grouping of the multiple CCs, wherein the UE switches the beams simultaneously if the multiple CCs are in a group of CCs, wherein each CC in the group of CCs use a same beam; and
    receiving communication from the base station for the second CC after a guard period based on the RTD.

12. An apparatus for wireless communication at a user equipment (UE), comprising:
    a memory; and
    at least one processor coupled to the memory and configured to:
      receive, from a base station, a transmission including an indication to change at least one of a transmission configuration indication (TCI) state for multiple component carriers (CCs), a spatial relation for the multiple CCs, or a pathloss reference signal (PL RS) for the multiple CCs; and
      switch beams in response to the transmission, wherein timing of the switching is based on a grouping of the multiple CCs, wherein the UE switches a first CC using a first beam at a first time and switches a second CC using a second beam at a second time, wherein the second time is spaced from the first time based on at least one of a receive time difference (RTD) between the first CC and the second CC or a new TCI state for the second CC being an unknown TCI state.

13. The apparatus of claim 12, wherein the at least one processor is configured to:
    switch the beams at different times if the multiple CCs are in different groups of CCs, each group of CCs using a different beam.

14. The apparatus of claim 13, wherein the different times are based on the RTD between the different groups of CCs.

15. The apparatus of claim 13, wherein the different times are based on a known TCI state or the unknown TCI state.

16. The apparatus of claim 12, wherein the second time is spaced from the first time based on the RTD between the first CC and the second CC.

17. The apparatus of claim 12, wherein the second time is spaced after the first time based on the new TCI state for the second CC being the unknown TCI state.

18. The apparatus of claim 17, wherein the at least one processor is configured to:
    transmit or receive on the second CC using a previous TCI state until the second time.

19. The apparatus of claim 12, wherein the at least one processor is configured to:
    switch the beams simultaneously if the multiple CCs are in a group of CCs, wherein each CC in the group of CCs use a same beam.

20. The apparatus of claim 19, wherein the TCI state is a known state for the first CC and an unknown state for the second CC, and wherein the at least one processor is configured to:
switch to a new beam selected using the known state for the first CC.

21. The apparatus of claim 19, wherein the TCI state is an unknown state for at least one of the multiple CCs, wherein the at least one processor is configured to:
perform measurements to select a new UE beam based on the TCI state for each of the CCs in the group of CCs using the same beam; and
switch to the new UE beam after performing the measurements.

22. An apparatus for wireless communication at a user equipment (UE), comprising:
a memory; and
at least one processor coupled to the memory and configured to:
indicate a receive time difference (RTD) between a first CC and a second CC to a base station;
receive, from the base station, a transmission including an indication to change at least one of a transmission configuration indication (TCI) state for multiple component carriers (CCs), a spatial relation for the multiple CCs, or a pathloss reference signal (PL RS) for the multiple CCs;
switch beams in response to the transmission, wherein timing of the switching is based on a grouping of the multiple CCs, wherein the UE switches the beams simultaneously if the multiple CCs are in a group of CCs, wherein each CC in the group of CCs use a same beam; and
receive communication from the base station for the second CC after a guard period based on the RTD.

23. A method of wireless communication at a base station, comprising:
transmitting, to a user equipment (UE), a transmission including an indication to change at least one of a transmission configuration indication (TCI) state for multiple component carriers (CCs) sharing a same beam, a spatial relation for the multiple CCs, or a pathloss reference signal (PL RS) for the multiple CCs; and
scheduling communication for the UE based on at least one of a receive time difference (RTD) between a first CC and a second CC or the TCI state being an unknown TCI state for at least one CC of the multiple CCs, wherein the base station schedules the communication for the UE using a guard period based on a maximum RTD.

24. The method of claim 23, further comprising:
receiving an indication of the RTD between the first CC and the second CC, wherein the base station schedules the communication for the second CC after the guard period based on the RTD between the first CC and the second CC.

25. The method of claim 23, wherein the TCI state is a known state for the first CC and the unknown state for the second CC, and wherein the base station schedules the communication for the UE on the second CC after transmission of a reference signal on the second CC using the TCI state.

26. The method of claim 23, wherein the TCI state is the unknown state for at least one of the multiple CCs, and wherein the scheduling communication for the UE includes:
restricting scheduling during a period of time for the UE to perform measurements to select a new beam based on the TCI state.

27. The method of claim 26, wherein restricting the scheduling includes limiting scheduling to a CC for which the TCI state is a known state during the period of time.

28. The method of claim 26, wherein restricting the scheduling includes avoiding scheduling communication on each of the multiple CCs when a reference signal for measurement is transmitted.

29. An apparatus for wireless communication at a base station, comprising:
a memory; and
at least one processor coupled to the memory and configured to:
transmit, to a user equipment (UE), a transmission including an indication to change at least one of a transmission configuration indication (TCI) state for multiple component carriers (CCs) sharing a same beam, a spatial relation for the multiple CCs, or a pathloss reference signal (PL RS) for the multiple CCs; and
schedule communication for the UE based on at least one of a receive time difference (RTD) between a first CC and a second CC or the TCI state being an unknown TCI state for at least one CC of the multiple CCs, wherein the base station schedules the communication for the UE using a guard period based on a maximum RTD.

* * * * *